United States Patent
Ibragimov et al.

(10) Patent No.: US 8,032,025 B2
(45) Date of Patent: Oct. 4, 2011

(54) POLARIZATION MONITORING IN POLARIZATION DIVISION MULTIPLEXING IN OPTICAL COMMUNICATIONS

(75) Inventors: Edem Ibragimov, Santa Clara, CA (US); Theodore J. Schmidt, Gilroy, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 535 days.

(21) Appl. No.: 12/256,326

(22) Filed: Oct. 22, 2008

(65) Prior Publication Data

US 2010/0098420 A1    Apr. 22, 2010

(51) Int. Cl.
*H04B 14/00* (2006.01)
(52) U.S. Cl. .......................... 398/65; 398/152; 398/184
(58) Field of Classification Search ............... 398/65, 398/74, 152, 184, 205
See application file for complete search history.

(56) References Cited

U.S. PATENT DOCUMENTS

| | | | |
|---|---|---|---|
| 6,678,431 B2 * | 1/2004 | Han et al. | 385/11 |
| 7,343,100 B2 * | 3/2008 | Yao | 398/152 |
| 7,539,415 B2 * | 5/2009 | Park et al. | 398/65 |
| 2002/0003641 A1 * | 1/2002 | Hall et al. | 359/122 |
| 2003/0147646 A1 * | 8/2003 | Zitelli | 398/65 |
| 2003/0175033 A1 * | 9/2003 | Taga et al. | 398/152 |
| 2004/0016874 A1 | 1/2004 | Rao et al. | |
| 2006/0093358 A1 | 5/2006 | Park et al. | |
| 2007/0134001 A1 | 6/2007 | Kim et al. | |
| 2007/0280689 A1 * | 12/2007 | Boffi et al. | 398/65 |
| 2008/0138070 A1 * | 6/2008 | Yan et al. | 398/65 |

OTHER PUBLICATIONS

Yao, X.S., et al, "All-optic scheme for automatic polarization division demultiplexing," Optics Express, 15 (12):7407-7414, Jun. 2007.
International Search Report and Written Opinion dated May 28, 2010 for International Application No. PCT/US2009/061729, filed Oct. 22, 2009 (7 pages).

* cited by examiner

*Primary Examiner* — Kenneth N Vanderpuye
*Assistant Examiner* — Abbas H Alagheband
(74) *Attorney, Agent, or Firm* — Fish & Richardson P.C.

(57) ABSTRACT

Systems and techniques for optical communications based on polarization division multiplexing are described.

21 Claims, 7 Drawing Sheets

POLARIZATION MONITORING IN POLARIZATION DIVISION MULTIPLEXING IN OPTICAL COMMUNICATIONS

This application relates to apparatus, systems, and techniques for optical communications based on polarization division multiplexing.

Optical communications can be implemented based on spectrally-efficient optical communication techniques to increase capacity of communication systems. Optical wavelength-division multiplexing (WDM), for example, has been widely used to increase the amount of data to be transmitted in a single fiber by simultaneously transmitting multiple optical WDM channels through the fiber. At each WDM wavelength, the state of optical polarization can be used to further increase the bandwidth of information transmission in optical WDM communication lines and systems. For example, information can be encoded in the polarization state through polarization division multiplexing (PDM) schemes for optical transmission. In one implementation PDM, for example, two different data channels can be encoded onto and carried by two different polarizations at the same WDM wavelength. In this and other polarization based data encoding systems, there is a need to mitigate effects of time-dependent polarization rotations in an optical transmission line in order to properly separate two PDM-encoded data channels at an optical receiver.

SUMMARY

In one aspect, a system for providing optical communication based on polarization mode multiplexing (PDM) includes an optical input port to receive an optical signal that carries first and second data channels on first and second orthogonal initial optical polarizations, respectively, based on polarization mode multiplexing (PDM). An RF tone signal is modulated onto light in the first initial optical polarization along with the first data channel while light in the second initial optical polarization is free of the RF tone signal. The system also includes a polarizing beam combiner (PBC) connected downstream from the optical input port to split light from the optical input port into a first beam in a first polarization and a second beam in a second polarization that is orthogonal to the first polarization. The system further contains a first optical detector to detect the first beam and to extract the first data channel and a second optical detector to detect the second beam and to extract the second data channel. A polarization controller is coupled between the optical input port and the PBC to control optical polarization of received light, which is directed from the optical input port, to produce output light propagating towards the PBC. Further, an optical splitter is coupled between the optical input port and the PBC to split a portion of received light, which is directed from the optical input port, as a probe beam and transmit the remainder of the received light towards the PBC for detection by the first and second optical detectors. The system also includes a polarization detection unit that receives the probe beam from the optical splitter and measures a polarization state of light received at the optical splitter and a power level of light associated with the RF tone signal. The system further contains a feedback control unit in communication with the polarization detection unit to produce a feedback control signal to the polarization controller to adjust the optical polarization of the light at the optical splitter to optimize a separation of the first and second data channels for optimal detection by, respectively, the first and second optical detectors.

In another aspect, a system for monitoring a polarization state of carrier signals in optical transmission lines including a transmitter configured to provide a multiplexed signal consisting of two orthogonally polarized signals, where a radio frequency (RF) tone modulates an optical power of one of the two signals. The system also includes an optical transmission line to carry the multiplexed signal, and the optical transmission line is coupled to the output of the transmitter. The system further includes a receiver coupled to the optical transmission line. The receiver includes a PBC configured to separate the two orthogonally polarized signals from the multiplexed signal. The receiver further includes two detector modules configured to respectively receive the two orthogonally polarized signals from the multiplexed signal, and a polarization monitoring module coupled to the optical transmission line at a point prior to the PBC. The polarization monitoring module is configured to measure a polarization state of the multiplexed signal. The polarization monitoring module further contains a non-polarizing beam-splitter coupled to the optical transmission line for extracting a monitoring signal. The polarization monitoring module includes a rotation and detection sub-module, coupled to the non-polarizing beam splitter via an extraction optical line. The rotation and detection sub-module is configured to manipulate the monitoring signal and to measure the polarization state of the monitoring signal. The rotation and detection sub-module contains an optical element configured to rotate a polarization angles of the monitoring signal. The rotation is adjusted to maximize a detection sensitivity of the RF tone. The rotation and detection sub-module includes an optical element configured to change a relative phase between polarization components of the monitoring signal. The relative phase is adjusted to maximize a detection sensitivity of the RF tone. The rotation and detection sub-module includes another PBC configured to separate two orthogonally polarized signals from the monitoring signal, an RF detector to detect the RF tone carried by at least one of the two separated orthogonally polarized signals from the monitoring signal. The monitoring module also contains a feedback sub-module configured to calculate a figure of merit based on the difference between a target polarization state of the multiplexed signal and the measured polarization state of the monitoring signal. The system further includes a polarization controller coupled upstream from the point to which the polarization monitoring module is coupled. The polarization controller is configured to change the polarization state of the multiplexed signal based on the figure of merit provided by the polarization monitoring module.

In another aspect, a method for monitoring a polarization state of a PDM signal received at a PDM detector is provided. Two orthogonaly polarized signals are provided, then an RF modulation is added onto one of the two signals. The two signals are multiplexed into a PDM signal. The PDM signal is transmitted through an optical transmission line to a PDM receiver. The method further includes extracting a monitoring signal from the received PDM signal. The extraction is performed before demultiplexing the PDM signal. Therefore, the polarization state of the monitoring signal is substantially the same as the polarization state of the PDM signal. The polarization state of the monitoring signal is measured. Then, the polarization state of the monitoring signal is compared with a target polarization state which was determined during a previously performed calibration procedure.

DETAILED DESCRIPTION

An optical communication system based on optical polarization division multiplexing (PDM) can include an optical PDM transmitter to encode two data channels onto two optical carrier beams with orthogonal polarizations, a transmission line such as optical fiber to transmit the encoded optical carrier beams as a PDM signal, and an optical PDM receiver that receives the PDM signal from the transmission line. The optical PDM receiver is configured to process the received two encoded optical carrier beams and extract the two encoded data channels.

Figure 1:
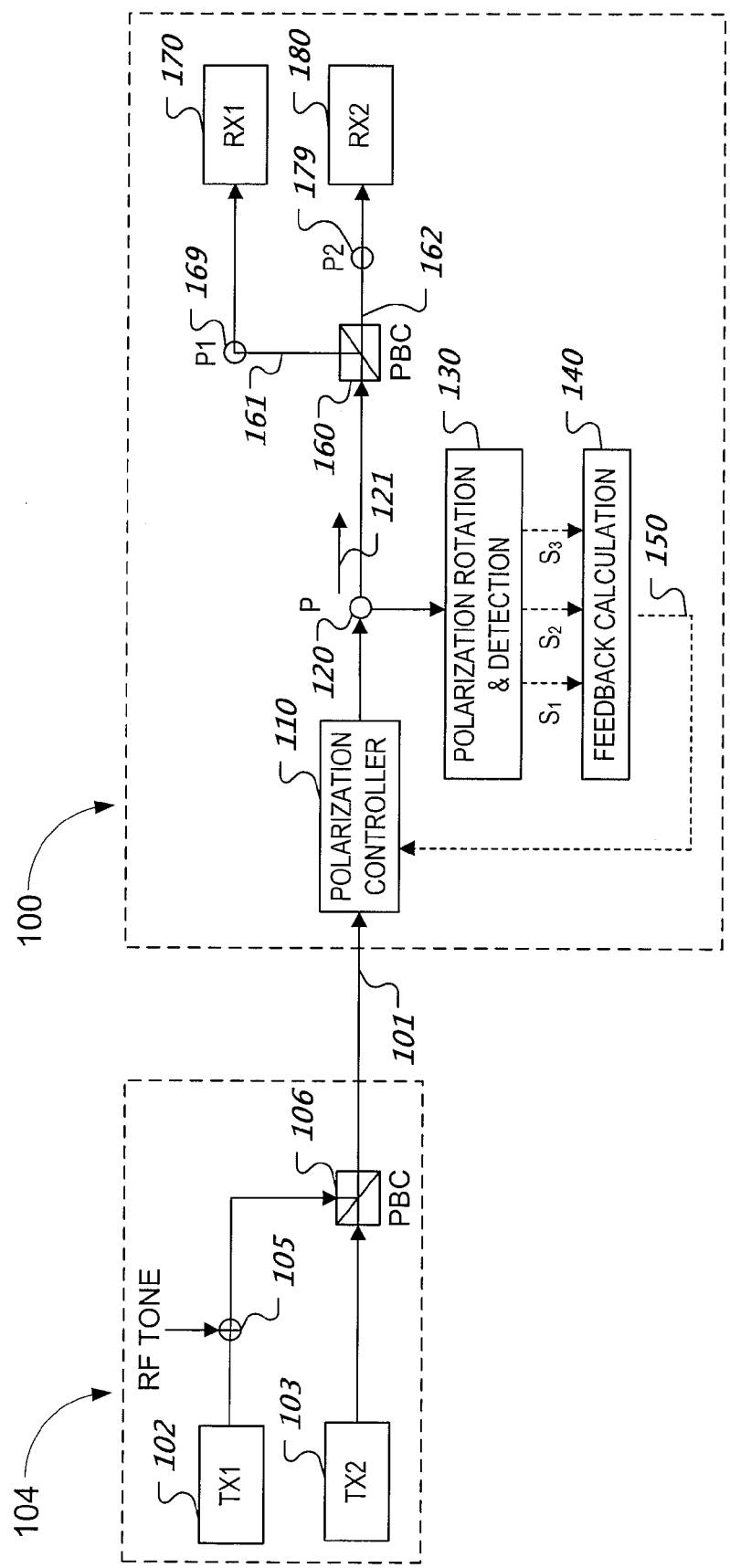
FIG. 1 shows schematics of the polarization monitoring module.

FIG. 1 illustrates an example of an optical PDM-based communication system having a PDM transmitter module 104 and a PDM receiver 100. The PDM transmitter module 104 is configured to include two optical transmitters TX1 102 and TX2 103 that generate, respectively, two orthogonally polarized signals. The first optical transmitter TX1 102 generates a first, vertically polarized optical carrier beam that is encoded with a first data channel. The second optical transmitter TX2 103 generates a second, horizontally polarized optical beam carrier encoded with a second data channel.

In addition, one of the two optical carrier beams, for example, the first optical carrier beam, is further modulated to carry a radio frequency (RF) modulation tone signal that is overlaid on the vertically polarized encoded signal launched by TX1 102. The RF modulation tone signal is used at the PDM receiver for sensitive polarization detection to extract the two data channels, as described below. The RF tone signal can have a modulation frequency that is much less than the data rates of the two data channels. Moreover, the RF tone signal can be added as power modulation, or phase modulation, or frequency modulation.

In the implementation illustrated in FIG. 1, the RF modulation tone signal can be added to the first optical carrier beam by an optical modulator 105 downstream from the optical transmitter TX1 102 or is directly modulated onto the first optical carrier beam by the optical transmitter TX1 102.

In another implementation, a second RF tone signal can be overlaid on the horizontally polarized encoded signal launched by TX2 103. In this implementation, the RF tone signal that modulates the first optical carrier beam has a different RF frequency from the second RF tone signal that modulates the second optical carrier beam. Therefore, the first RF tone can be detected independently from the second RF tone. An implementation including two RF tones can increase the polarization measurement efficiency as two components of the polarization state may be measured simultaneously (in parallel). For example, one polarization component can be measured by detecting the first RF tone (as described later in this specification), and in parallel, a second polarization component can be measured by detecting the second, distinct RF tone. Thus, the two polarization components can be measured simultaneously.

In yet another implementation, a more accurate calibration may be attained by using two RF tones instead of one. The increased accuracy is due to a validation (confirmation) measurement, carried out using the second RF tone, after completion of a first calibration measurement using the first RF tone.

In another aspect, modulation of the two polarized components of the PDM signal using two different RF tones can be used to determine polarization dispersion loss (PDL). For example, the two polarizations cease to be relatively orthogonal in the presence of PDL. Using two distinct RF tones, it is possible to measure the (angular) orientation of each of the two polarizations components of the PDM signal. Subsequently, the relative angle between the polarization components of the PDM signal can be obtained as the difference between the polarization angle of the first data channel and the polarization angle of the second data channel.

Returning to FIG. 1, a polarization beam combiner (PBC) 106 is used to combine the orthogonally polarized optical carrier beams into a PDM signal for transmission through an optical transmission line 101 which can include one or more fiber links in a fiber network. Hence, the two signals represent polarization tributaries of the PDM signal.

FIG. 1 further shows an example implementation of the optical PDM receiver 100. The PDM receiver 100 includes a polarizing beam combiner (PBC) 160 that splits the received light into a first beam 161 and a second beam 162 that are orthogonally polarized to each other. Two optical receivers 170 (Rx1) and 180 (Rx2) are provided to receive the two beams 161 and 162, respectively, and are operable to extract the two data channels encoded into the original PDM signal generated at the PDM transmitter 104. For example, the PBC 160 can be a PBC cube to split the light into the vertically polarized beam 161 and the horizontally polarized beam 162. The vertically polarized signal 161 is reflected by the PBC 160 to the first receiver 170, while the horizontally polarized signal 162 transmits through PBC 160 to the second receiver 180.

The polarization of the original PDM signal rotates during propagation through transmission lines due to mechanical strain induced by pinching or bending the optical fiber. Even though the polarization of the PDM signal can rotate during transmission, the relative polarization of the two optical beams contained in the PDM signal does not change in the absence of polarization mode dispersion and polarization dispersion loss. Therefore, the polarizations of the two optical carrier beams remain orthogonal during transmission. Due to various polarization effects during the transmission, the two orthogonal polarizations of the two optical carrier beams generated by the PDM transmitter 104 are rotated during the transmission and can be mixed at the PBC 160. As such, each of the two orthogonally polarized beams 161 and 162 produced by the PBC 160 can carry light modulated with the first data channel and light modulated with the second data channel. The mixing at the PBC 160 leads to crosstalk noise. Therefore it is useful to monitor and adjust the polarization state of the PDM signal received at the PBC 160, in order to enable the PBC 160 to separate the two optical carrier beams generated by the PDM transmitter 104 into the output beams 161 and 162. The output beams 161 and 162 carry the two data channels respectively, for separate optical detection at the two receivers 170 and 180.

A polarization state can be represented and quantified by a 4-component vector, the Stokes vector. For polarized light, three components of the Stokes vector are independent. Thus any polarization state may be represented by a point on the surface of the Poincare sphere formed in a polarization space. The polarization state is determined by the relative size and the relative phase between the components of the polarization vector.

To separate the two optical carrier beams generated by the PDM transmitter 104 at the PBC 160, the PDM receiver 100 is configured to include a polarization controller 110 upstream from the PBC 160 to control polarization of light going towards the PBC 160. A beam splitter 120 upstream from the PBC 160 splits a portion of the received light as a probe beam 121 and transmits the remaining received light 122 to the PBC 160. A polarization rotation and detection unit 130 measures two or more polarization states of the probe beam 121. A feedback control unit 140 controls the polarization controller 110 based on the polarization measurements from the polarization rotation and detection unit 130. A feedback control signal 150 is generated by the feedback control unit 140 and is fed into the polarization controller 110.

An efficient monitoring and feedback system relies on sensitive measurements of a monitored parameter. The monitored parameter for the PDM receiver 100 is the polarization state of the PDM signal at point P 120, in front of the PCB 160. Once the polarization state of the PDM signal at point P 120 is accurately known, the polarization controller can appropriately adjust the polarization state of the PDM signal, such that the PBC 160 can separate the two optical carrier beams generated by the PDM transmitter 104 into the output beams 161 and 162. A sensitive measurement of the polarization state of the PDM signal at point P 120 is provided by the rotation and detection unit 130. Specifically, two detecting features can be combined together to achieve high sensitivity of the polarization state measurement performed inside the rotation and detection unit 130. The first detecting feature is to use lock-in detection techniques to measure changes in amplitude of the RF tone signal contained in the probe beam 121. The second detecting feature is to use the polarization rotation and detection unit 130 in conjunction with the polarization controller 110 to select a sensitive detection regime for measuring changes in amplitude of the RF tone signal, as explained below in reference to FIGS. 1 and 2(a)-(b).

Figure 2A:
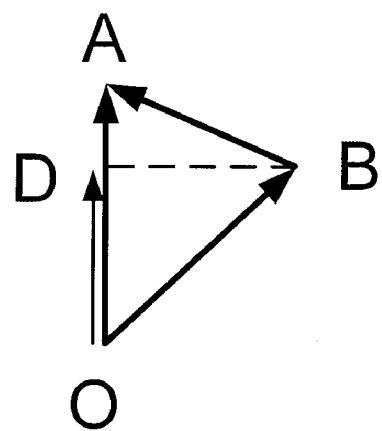
FIG. 2(a) shows a two-dimensional representation of a measured polarization and a target polarization.

When the extraction of the probe signal is performed at a location P 120 upstream from the PBC 160, as shown in FIG. 1, the measurement sensitivity can be increased substantially as compared with the detection at the point P1 169. The RF signal can be detected before the PBC 160 with higher sensitivity when compared to detection at the point P1 after the PBC 160, because the PBC 160 removes all polarization components except for the one aligned with the target polarization, as it is shown in the FIG. 2(a). FIG. 2(a) is a two dimensional representation of the target polarization vector OA and the vector OB corresponding to the current state of polarization. If the RF signal detection is performed downstream of the PBC 160, only the component DA of the difference between the target polarization OA and the current polarization state OB is detected.

Alternately, when the RF signal detection is performed upstream of the PBC 160 the entire polarization vector OB can be detected. Equivalently, the difference between the current polarization state OB and the target polarization state OA is characterized by vector BA. When the measured polarization OB is close to the target polarization OA the angle alpha (defined in FIG. 2(a)) is small, while the difference vector AB is larger than the component DA. The sensitivity enhancement can be characterized by the ratio |BA|/|DA|=1/sin(alpha).

Figure 2B:
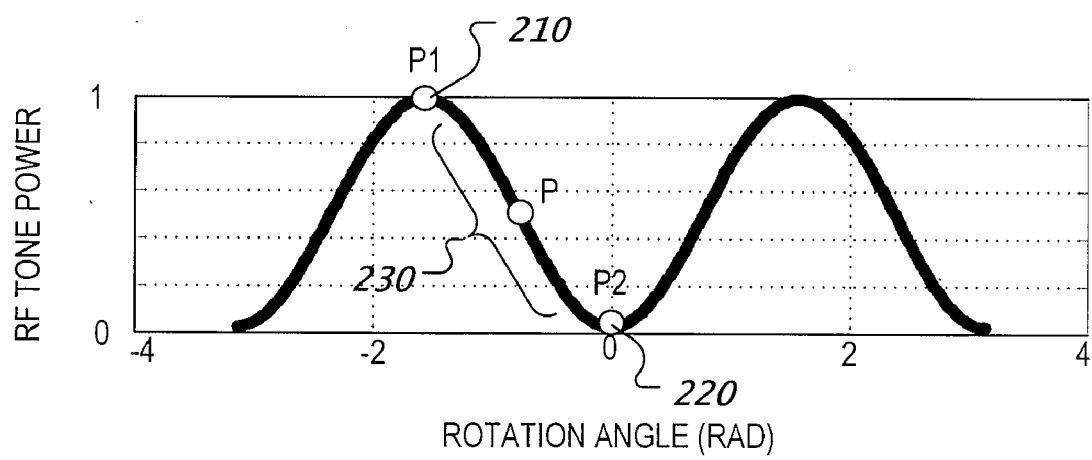
FIG. 2(b) shows the normalized optical power of a linearly polarized signal vs. the rotation angle of the polarization controller.

FIG. 2(b) provides additional insight into the detection process. While the polarization component parallel to the target polarization reaches the maximum (or minimum) at the target state (points P1 and P2), the component perpendicular to the target state undergoes a maximum change (represented by point P in the graph). Therefore, measuring the component perpendicular to the target polarization moves the detection process from the point P1/P2 to the point P.

In contrast to the a high sensitivity monitoring regime corresponding to region 230 in FIG. 2(b), the extreme points P1 210 and P2 220 correspond to a low sensitivity monitoring regime. Returning to FIG. 1, the RF tone detected at point P1 169 is close to maximum, while the RF tone signal detected at point P2 179 is close to zero. In FIG. 2(b), the RF tone signal amplitude detected at point P1 169, respectively at point P2 179, corresponds to the maximum (P1-210), respectively the minimum (P2-220) of the RF tone signal vs. rotation angle curve. Small changes in angle around the minimum or maximum lead to small changes in amplitude. Therefore, detection of changes in amplitude of the RF tone signal at point P1 169 or at point P2 179 provides poor sensitivity to changes in rotation angle. Such poor detection sensitivity leads to poor polarization monitoring sensitivity and diminished feedback performance. Thus, the detection of the component perpendicular to the target state provided by the unit 130 placed at point P 120 enables a transition from a low sensitivity monitoring regime, corresponding to 210, 220 in FIG. 2(b), to a high sensitivity monitoring regime, corresponding to 230 in FIG. 2(b).

The extraction is performed, at a location P 120, prior to separating two orthogonal polarizations at the PBC 160. During the polarization monitoring process, the monitoring signal is passed through a polarization rotation and detection unit 130 of a monitoring module. Inside this unit 130, the polarization state of the monitoring signal 121 is altered, or rotated in the Stokes parameter space (or on the Poincare sphere). The alteration may be an angular rotation of the polarization vector, or a phase rotation. The phase rotation represents a delay between the components of the polarization vector. After a change in the polarization state of the monitoring signal 121 is induced, the RF tone signal carried by each of the components of the polarization vector is detected and analyzed. Two or more polarization state alterations and the corresponding detections are performed to determine two or more independent parameters and characterize the monitoring signal 121.

The adjustment performed by the polarization controller 110 can be quantified and implemented in terms of a figure of merit. The figure of merit quantifies the difference between the measured polarization state and a target polarization state may also be established. Specific implementations of the figure of merit are described below. The target polarization state corresponds to the polarization state of the PDM signal measured at point P 120 for which the PBC can separate the two optical carrier beams generated by the PDM transmitter 104 into the output beams 161 and 162. A procedure to establish the target polarization state is presented in the next section. Returning to the use of the figure of merit, the polarization state is measured by the polarization and detection unit 130, and a figure of merit is calculated by the feedback unit 140, to quantify the difference between the measured polarization state and the target polarization state. When the figure of merit is over an acceptable threshold, the feedback sub-module 140 instructs the polarization controller 110 receiving the feedback from the monitoring module to adjust the polarization of the PDM signal. The adjustment is performed to reduce the difference between the measured polarization state and the target polarization state, and to minimize the figure of merit.

As mentioned above, the measured polarization state of the monitoring signal 121 may be compared with a previously determined target polarization state. The target polarization state corresponds to the polarization state of the PDM signal at point P 120 which causes optimized reception of the two orthogonally polarized beams 161 and 162, produced by the PBC 160 at the first and second receiver 170 and 180. The target polarization state is determined during a calibration procedure for the PDM receiver 100. In an exemplary implementation of the calibration procedure, TX2 103 is turned off and only one test signal provided by TX1 102 is sent through the transmission line 101. No RF tone modulation is added 105 to the test signal. The polarization state of the test signal is adjusted using the polarization controller 110 to null the power detected at the second receiver 180 and maximize the power detected at the first receiver 170. The polarization state measured under these conditions is recorded as the target polarization state.

Figure 3:
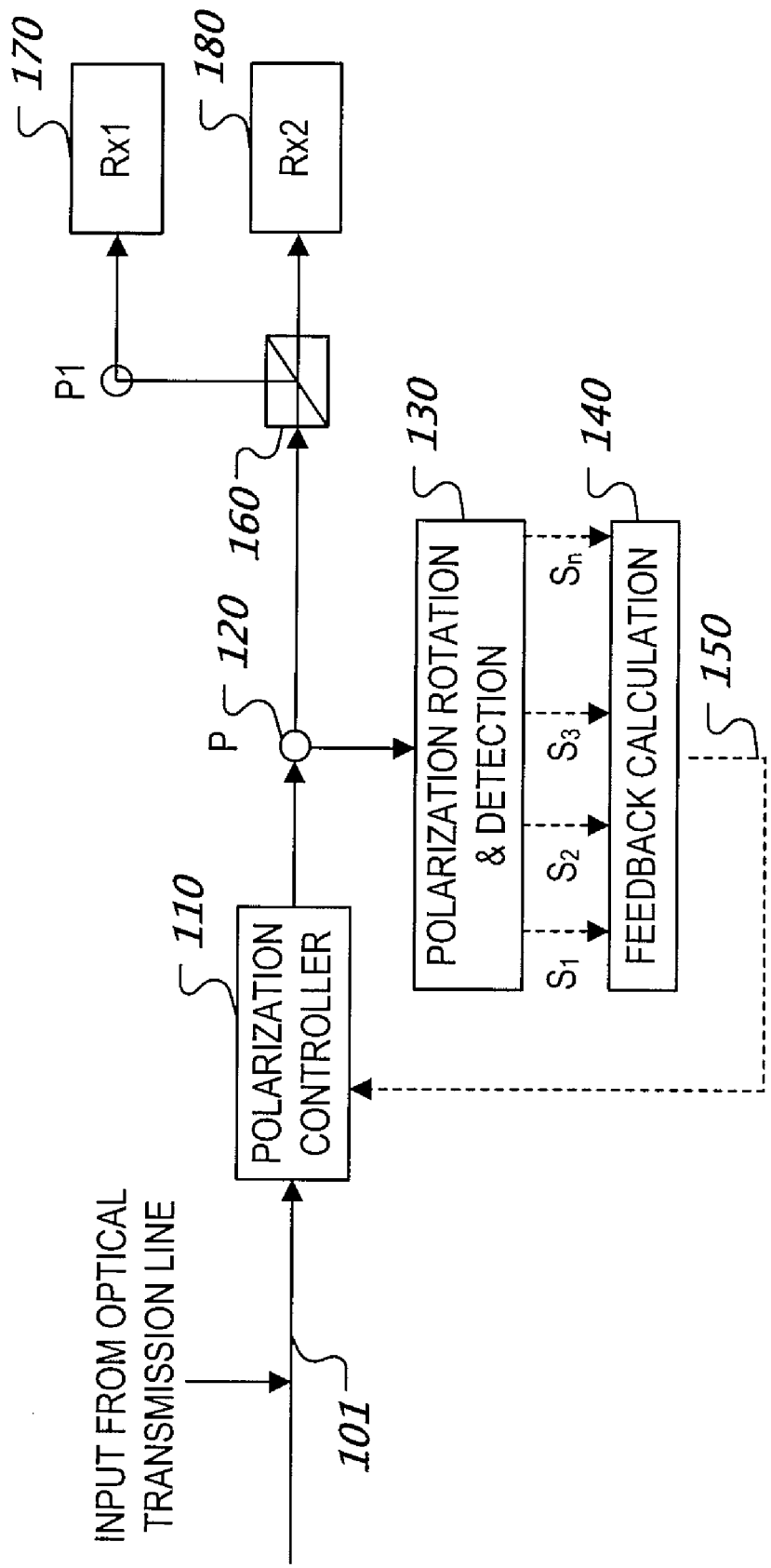
FIG. 3 shows another schematic of the polarization monitoring module.

FIG. 3 shows an example of a monitoring module that enables N polarization alterations followed by the respective detection steps. In FIG. 1, the two or more independent components of the polarization vector, or the polarization state, can be uniquely determined by two or more measurements. If more than two measurements are performed, then the polarization state is over-determined. An over-determined set of measurements allows for estimation of measurement error. Quantifying the noise due to measurement error allows for setting appropriate guard-bands during the feedback process. For example, it is useful to know the measurement error when assessing the difference between the target figure of merit and measured figure of merit.

Figure 4:
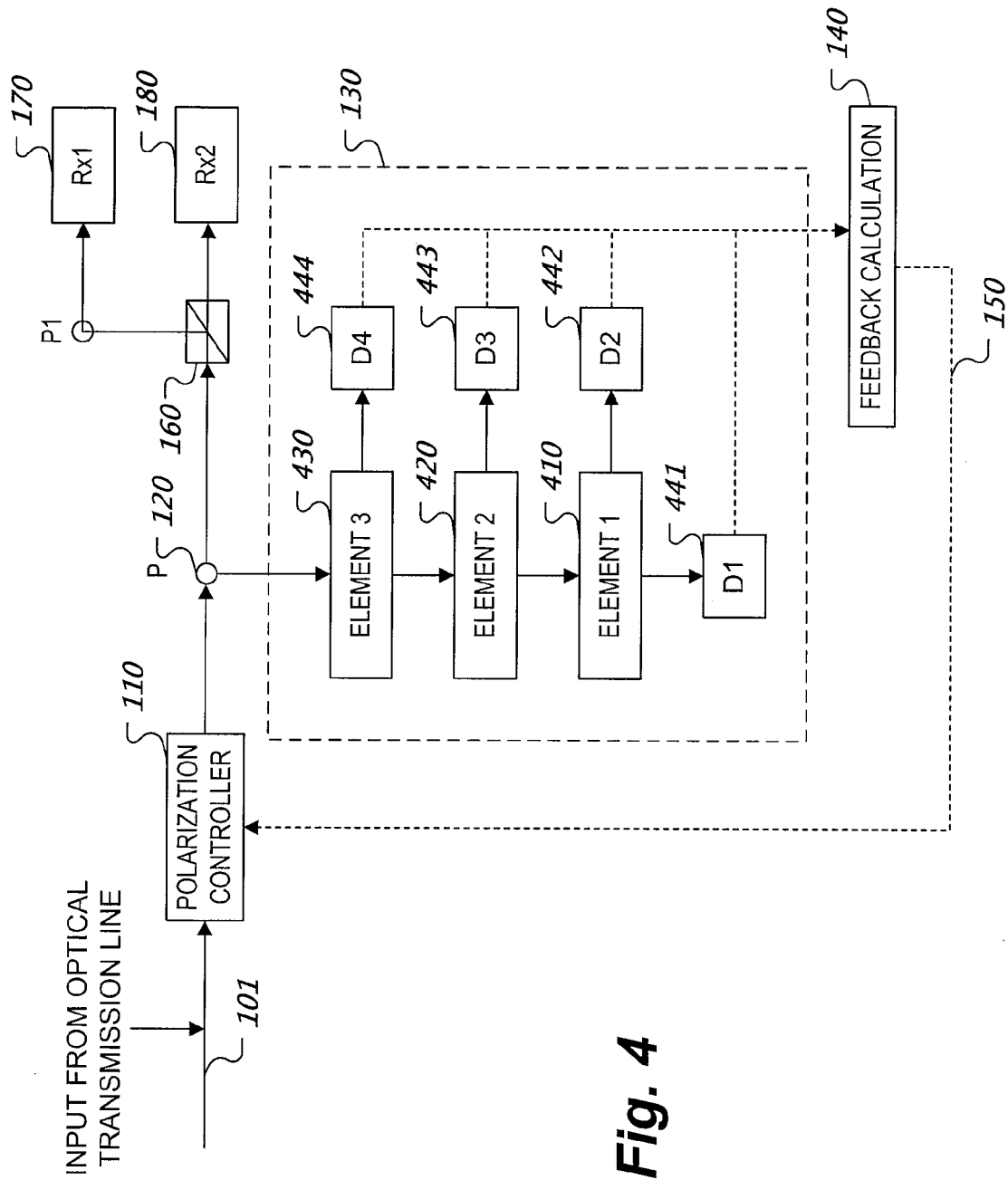
FIG. 4 shows a schematic of a sub-module of the polarization monitoring module.

The components of the rotation and detection sub-module 130 of the monitoring module are illustrated in FIG. 4. The monitoring signal 121 is passed through consecutive rotation elements 410, 420 and 430. The rotation may be an angular rotation between the components of the polarization vector. The rotation may also be a phase rotation between the components of the polarization vector. At least one component of the rotated polarization vector is measured at each rotation element. The rotation elements 410, 420 and 430 represented in FIG. 4 may be 3 discrete elements. In this implementation, detection of the rotated components is performed simultaneously. The rotation elements 410, 420 and 430 represented in FIG. 4 may be 3 temporal instances of the same element. In this case detection of the multiple rotated components is performed sequentially: a first rotation is followed by a first detection, then a second rotation is followed by a second detection, and so on. In both implementations, the resulting N measurements are processed by the feedback sub-module 140 to estimate the polarization state of the monitoring signal. Then, the feedback sub-module 140 interacts with the polarization controller 110 as discussed in reference to FIGS. 1 and 3.

As discussed above, if the component perpendicular to the target state is the only one component of the polarization vector that is being measured, the high sensitivity of the measurement is not sacrificed. Because the above mentioned component lies in a plane perpendicular to the target state, a minimum of two measurements are taken. Thus, the high-sensitivity of the polarization state measurement can be preserved, even if only a subset of Stokes vector components are determined.

Figure 5:
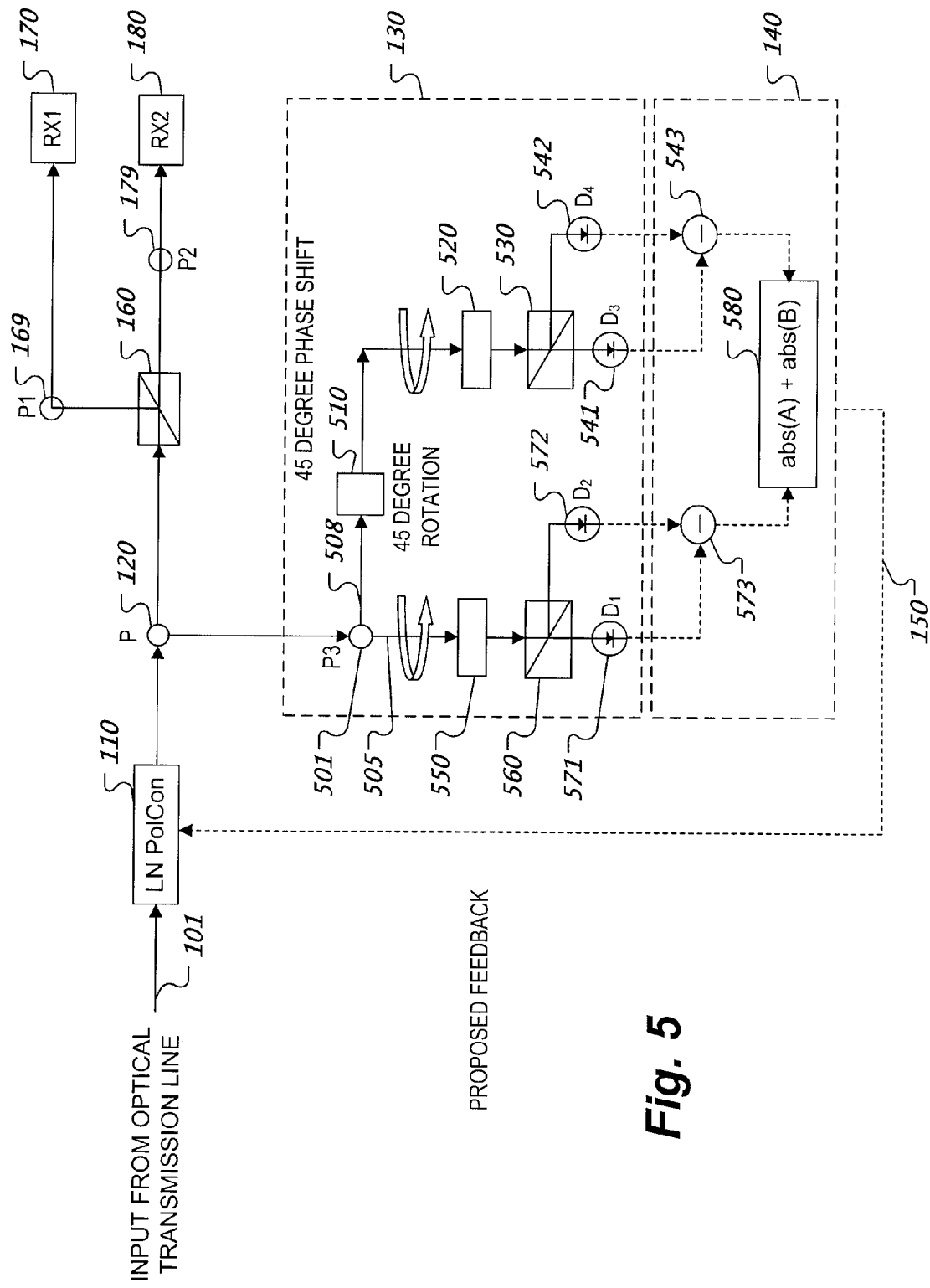
FIG. 5 shows implementations of the sub-modules of the polarization monitoring module.

FIG. 5 shows another exemplary implementation of the monitoring module characterized by only two measurements. The rotation sub-module 130 of the monitoring module includes two branches 505 and 508 separated at point P3 by a beam splitter 501. The extraction element 501 at point P3 is equivalent to the beam splitter 120 at point P (discussed in detail in reference to FIG. 1). The polarization angle of the monitoring signal 121 is rotated by 45 degrees, when the monitoring signal 121 passes through the first branch 505. The components of the rotated polarization vector are then separated by a PBC 560, and collected by the detectors D1 571 and D2 572. The rotating element 550 shifts the RF tone signal power level to the most sensitive region 230 of the RF tone signal power vs. angle curve, presented in FIG. 2 and denoted as the fast-change P-region 230.

A second branch 508 rotates the relative phase between the components of the polarization vector of the monitoring signal 121 by 45 degrees. If the monitoring signal 121 initially contains a phase shift, of say 45 degrees (the monitoring signal 121 is circularly polarized), the effect of the phase rotator 510 is to compensate the original relative phase, and causing the monitoring signal 121 to become linearly polarized. The angular rotation plate 520 rotates the linearly polarized signal. Furthermore, the components of the rotated polarization vector are separated by a PBC 530, and collected by the detectors D3 541 and D4 542. Again, the combined effect of the phase rotator 510 and angular rotator 520 on the second branch 508 is to shift the RF tone signal power level to the most sensitive region 230 of the RF tone signal power vs. angle curve, presented in FIG. 2 and denoted as the fast-change P-region 230.

An exemplary implementation of the feedback calculation sub-module 140 is shown in FIG. 5. The difference 573 between the signals D1 571 and D2 572 collected on the first branch 505 is calculated, then the difference 543 between the signals D3 541 and D4 542 collected on the second branch 508 is calculated. The differential detectors 573 and 543 configured to calculate signal differences can be implemented as differential amplifiers (if the difference is obtain in the electronics domain) or balanced photodetectors (if the difference is obtain in the optics domain). The absolute value of the differences are added 580 to generate a figure of merit. In the current configuration, a noiseless monitoring signal would render the figure of merit zero. Equivalently, the target polarization state for this implementation corresponds to a figure of merit equal to zero. The feedback mechanism 150 of the polarization controller 110 is activated when the figure of merit increases over a predetermined threshold, as discussed in reference to FIG. 3.

In another implementation, the differences are first squared and then the squares are added to define a figure of merit. For this implementation, a figure of merit equal to zero corresponds to the target polarization state.

Figure 6:
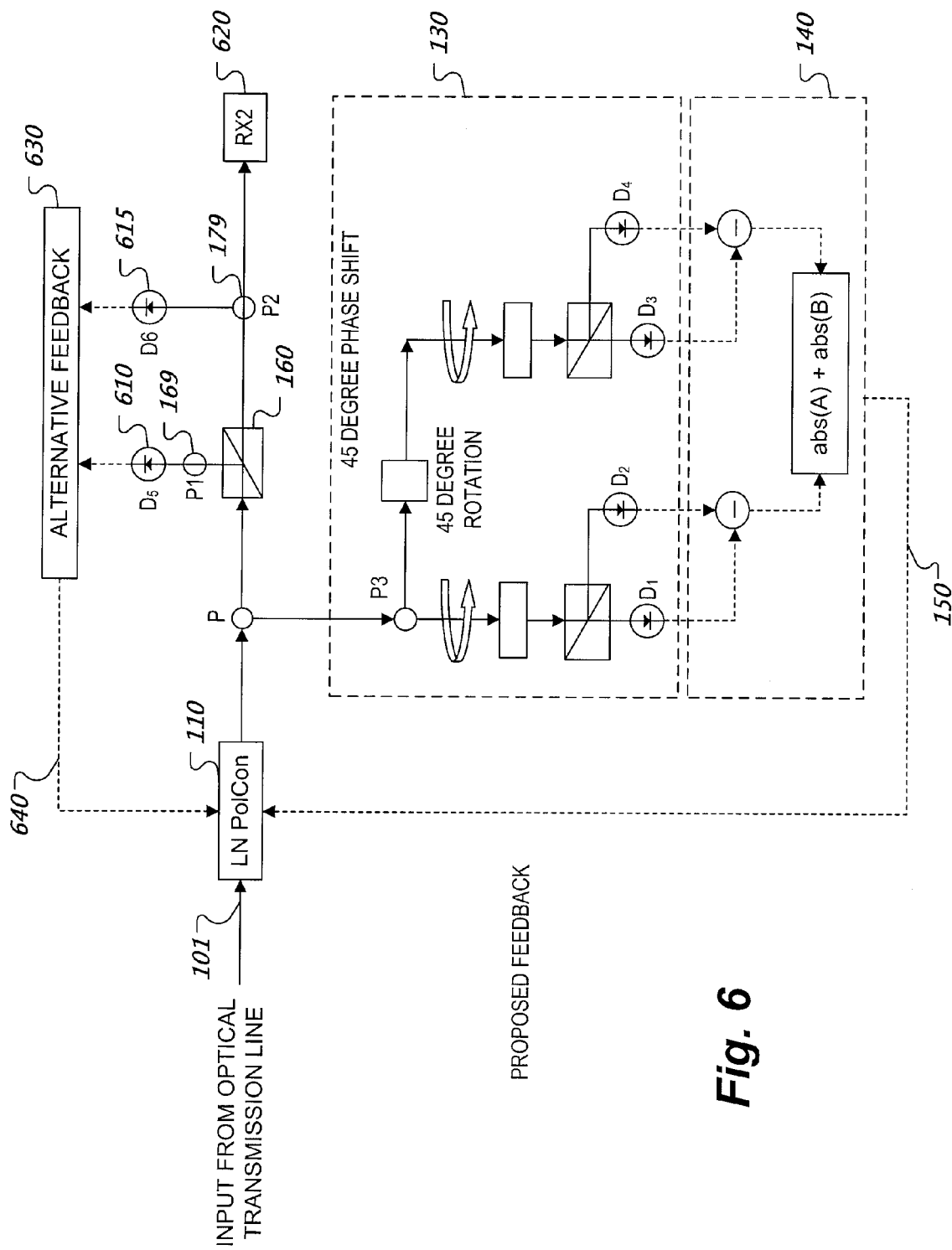
FIG. 6 shows an implementation of the polarization monitoring module and an alternative polarization monitoring scheme.
Figure 7:
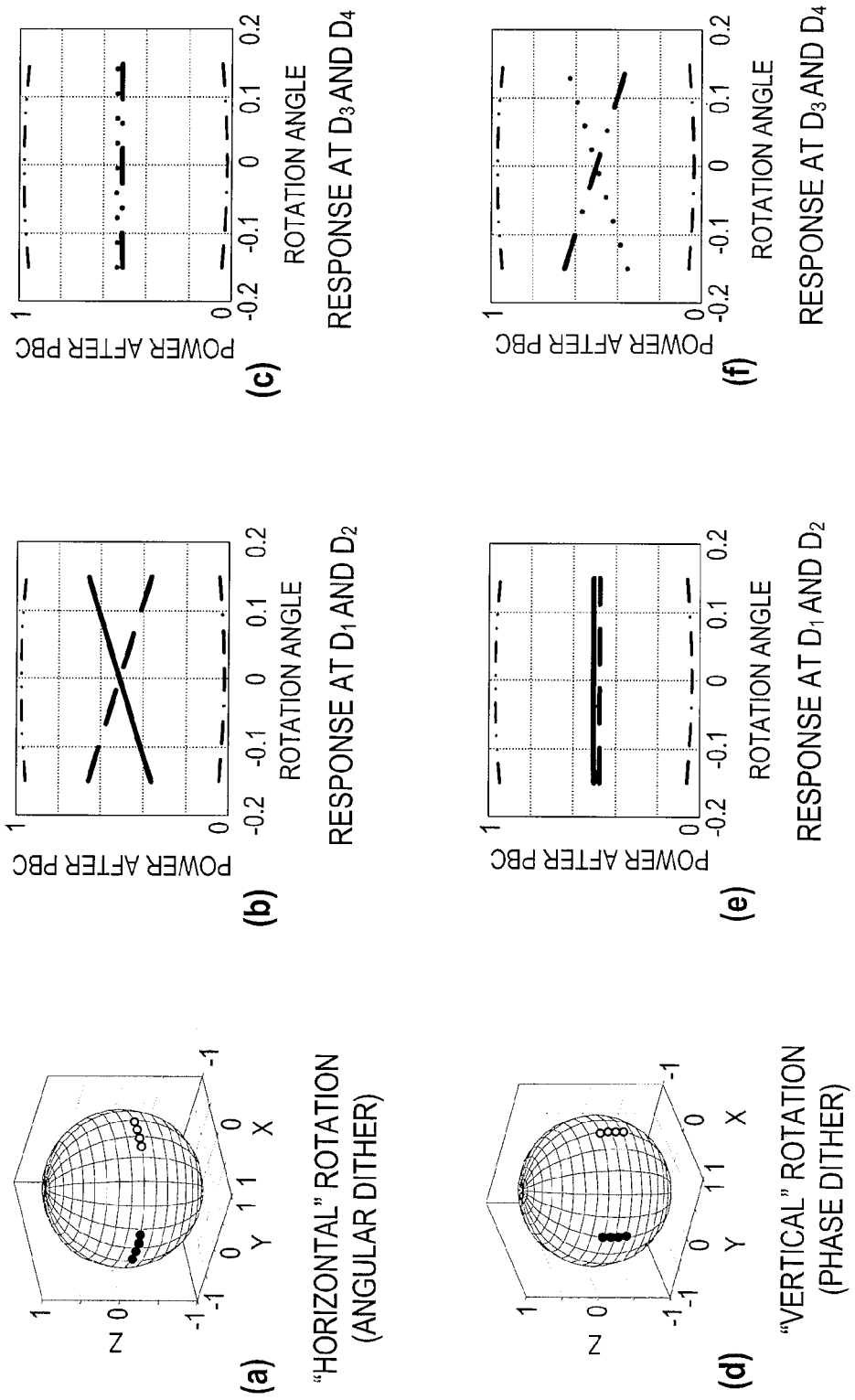
FIG. 7 shows a comparison between the polarization monitoring sensitivity achieved by using the polarization monitoring module and using an alternative polarization monitoring scheme.

FIGS. 6 and 7 present sensitivity measurements of a polarization monitoring implementation where the monitoring signal 121 is extracted before PBC 160, at point P 120. For comparison, the sensitivity of an alternative implementation of polarization monitoring is also estimated. In the alternative implementation, an RF tone signal is detected after PBC at point P1 169, by detector D5 610, or at point P2 179, by detector D6 615. The sensitivity of the polarization measurement performed at points P1 169 and P2 179 degrades when the polarization approaches the target state. In contrast, the measurement sensitivity of the perpendicular polarization component determined at point P 120 stays the same. Consequently, the feedback 150 provided by the monitoring module 130-140 provides much higher sensitivity compared to the feedback 640 provided by the alternative feedback module 630.

Different sensitivities are obtained for polarization state measurements using the two branches in FIG. 6, including detectors D1 571, D2 572 and D3 541, D4 542, depending on the actual orientation of the measured polarization with respect to the target state (see FIG. 2(*a*)). As shown in FIG. 7, when the polarization deviates from the target state in a horizontal plane, the detectors D1 571 and D2 572 have the highest sensitivity. When the polarization deviates from the target state in the vertical plane, the detectors D3 541 and D4 542 have the highest sensitivity. For an arbitrary orientation of the polarization, there exists a combination of the detectors D1, D2, D3, and D4 maximizes the sensitivity of the polarization measurement.

The filled and empty circles in the equator plane of the Poincare sphere in FIG. 7(*a*) correspond to small angular rotations (dither) of the polarization vector of the monitoring signal 121. FIGS. 7(*b*) and 7(*c*) illustrate the poor sensitivity for the RF tone signal power monitored by D5 610 and D6 615, as anticipated by the graph in FIG. 2 (regions 210 and 220). The RF tone signal power monitored by D5 610 and D6 615 is denoted by the double-dashed-dotted and dashed-double-dotted lines, respectively, in FIGS. 7(*b*) and 7(*c*). On the other hand, the RF tone signal power monitored at detectors D1 571 and D2 572 presents improved sensitivity to angular dither, as shown in FIG. 7(*b*) and anticipated by the graph in FIG. 2 (region 230). The RF tone signal power monitored by D1 571 and D2 572 is denoted by the continuous and dashed lines in FIG. 7(*b*). The RF tone signal power monitored at detectors D3 541 and D4 542 is expected to be flat as it corresponds to an angular average of circularly polarized signal components (see FIG. 7(*c*)). The RF tone signal power monitored by D3 541 and D4 542 is denoted by the dotted and dashed-dotted lines in FIG. 7(*c*).

The filled and empty circles in the first meridian plane of the Poincare sphere in FIG. 7(*d*) correspond to small relative phase rotations (dither) between the components of the polarization vector of the monitoring signal 121. Once again, FIGS. 7(*e*) and 7(*f*) illustrate poor sensitivity for the RF tone signal power monitored at point P1 610 and D6 615, as anticipated by the graph in FIG. 2 (regions 210 and 220). The RF tone signal power monitored by D5 610 and D6 615 is denoted by the double-dashed-dotted and dashed-double-dotted lines, respectively, in FIGS. 7(*e*) and 7(*f*). On the other hand, the RF tone signal power monitored at detectors D3 541 and D4 542 presents improved sensitivity to phase dither, as shown in FIG. 7(*f*) and anticipated by the graph in FIG. 2 (region 230). The RF tone signal power monitored by D3 541 and D4 542 is denoted by the dotted and dashed-dotted lines in FIG. 7(*f*). The RF tone signal power monitored at detectors D1 571 and D2 572 is expected to be flat as it corresponds to an angular average of circularly polarized signal components (see FIG. 7(*e*)). The RF tone signal power monitored by D1 571 and D2 572 is denoted by the continuous and dashed lines in FIG. 7(*e*).

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated.

What is claimed is what is described and illustrated, including:

1. A system for providing optical communication based on polarization division multiplexing (PDM), comprising:
    an optical input port to receive an optical signal that carries first and second data channels on first and second orthogonal initial optical polarizations, respectively, based on PDM, wherein a radio frequency (RF) tone signal is modulated onto light in the first initial optical polarization along with the first data channel while light in the second initial optical polarization is free of the RF tone signal;
    a polarizing beam combiner (PBC) connected downstream from the optical input port to split light from the optical input port into a first beam in a first polarization and a second beam in a second polarization that is orthogonal to the first polarization;
    a first optical detector to detect the first beam and to extract the first data channel;
    a second optical detector to detect the second beam and to extract the second data channel;
    a polarization controller coupled between the optical input port and the PBC to control optical polarization of received light, which is directed from the optical input port, to produce output light propagating towards the PBC;
    an optical splitter coupled between the optical input port and the PBC to split a portion of received light, which is directed from the optical input port, as a probe beam and transmit the remainder of the received light towards the PBC for detection by the first and second optical detectors;
    a polarization detection unit that receives the probe beam from the optical splitter and measures a polarization state of light received at the optical splitter and a power level of light associated with the RF tone signal; and
    a feedback control unit in communication with the polarization detection unit to produce a feedback control signal to the polarization controller to adjust the optical polarization of the light at the optical splitter to optimize a separation of the first and second data channels for optimal detection by, respectively, the first and second optical detectors.

2. The system of claim 1, wherein:
    the optical splitter is connected downstream from the polarization controller.

3. The system of claim 1, wherein:
    the polarization detection unit comprises polarization rotation elements configured to rotate the polarization of the probe beam, thus enabling a transition from a low sensitivity monitoring regime, wherein small changes in rotation angle correspond to small changes in detected RF tone signal power, to a high sensitivity monitoring regime, wherein small changes in rotation angle correspond to large changes in detected RF tone signal power.

4. The system of claim 1, wherein:
the polarization detection unit comprises a plurality of polarization rotation elements for simultaneous measurement of a plurality of independent components of the polarization state.

5. The system of claim 1, wherein:
the polarization detection unit comprises one adjustable polarization rotation element for sequential measurement of a plurality of components of the polarization state.

6. The system of claim 1, wherein the polarization detection unit comprises:
another optical splitter to separate the probe beam into a first probe beam and second probe beam;
an angular rotation branch to rotate the first probe beam, comprising:
an angular rotation element placed downstream from the another optical splitter;
a second PBC placed downstream from the angular rotation element to split the rotated first probe beam into orthogonally polarized components; and
two detectors to measure the RF tone signal of the two orthogonally polarized components of the rotated first probe beam;
a phase rotation branch to rotate the second probe beam, comprising:
an phase rotation element placed downstream from the another optical splitter;
an angular rotation element placed downstream from the phase rotation element;
a third PBC placed downstream from the angular rotation element to split the rotated second probe beam into orthogonally polarized components; and
two other detectors to measure the RF tone signal of the two orthogonally polarized components of the rotated second probe beam.

7. The system of claim 6, wherein the feedback control unit comprises:
a differential detector to calculate a first difference of the RF tone signal of the two orthogonally polarized components of the rotated first probe beam;
another differential detector to calculate a second difference of the RF tone signal of the two orthogonally polarized components of the rotated second probe beam; and
a summation element to add an absolute value of the first difference and an absolute value of the second difference.

8. A system for monitoring a polarization state of carrier signals in optical transmission lines comprising:
a transmitter configured to provide a multiplexed signal consisting of two orthogonally polarized signals, the transmitter comprising:
an optical modulator configured to modulate a radio frequency (RF) tone signal onto one of the two orthogonally polarized signals;
an optical transmission line to carry the multiplexed signal, wherein the optical transmission line is coupled to the output of the transmitter; and
a receiver coupled to the optical transmission line, the receiver comprising:
a polarizing beam combiner (PBC) configured to separate the two orthogonally polarized signals from the multiplexed signal;
two detector modules configured to respectively receive the two orthogonally polarized signals from the multiplexed signal;
a polarization monitoring module coupled to the optical transmission line at a point prior to the PBC, the polarization monitoring module configured to measure a polarization state of the multiplexed signal, the polarization monitoring module comprising:
a non-polarizing beam-splitter coupled to the optical transmission line for extracting a monitoring signal;
a rotation and detection sub-module, coupled to the non-polarizing beam splitter via an extraction optical line, the rotation and detection sub-module configured to manipulate the monitoring signal and measure the polarization state of the monitoring signal, comprising:
an optical element configured to rotate a polarization angles of the monitoring signal, wherein the rotation is adjusted to maximize a detection sensitivity of the RF tone;
an optical element configured to change a relative phase between polarization components of the monitoring signal, wherein the relative phase is adjusted to maximize a detection sensitivity of the RF tone;
another polarizing beam combiner (PBC) configured to separate two orthogonally polarized signals from the monitoring signal;
an RF detector to detect the RF tone carried by at least one of the two separated orthogonally polarized signals from the monitoring signal;
a feedback sub-module configured to calculate a figure of merit based on the difference between a target polarization state of the multiplexed signal and the measured polarization state of the monitoring signal; and
a polarization controller coupled upstream from a point to which the polarization monitoring module is coupled, the polarization controller configured to change the polarization state of the multiplexed signal based on the figure of merit provided by the polarization monitoring module.

9. The system of claim 8, wherein the optical modulator is configured to provide the RF tone signal as power, phase or frequency modulation.

10. The system of claim 8, wherein the optical modulator is configured to provide a first RF tone signal modulated onto first of the two orthogonally polarized signals, the system comprising another optical modulator configured to provide a second RF tone signal modulated onto second of the two orthogonally polarized signals, wherein the first and second RF tone signals have different frequencies.

11. The system of claim 8, wherein the rotation and detection sub-module comprises:
another non-polarizing beam-splitter coupled to the extraction optical line for separating the monitoring signal into a first signal and a second signal;
a polarization angle-rotation branch transmitting the first signal, the polarization angle-rotation branch comprising:
an optical element to rotate the polarization angle by approximately 45°;
a first PBC to separate the first signal into two orthogonally polarized signals;
two detectors to detect the RF tone modulating the two separated orthogonally polarized signals from the first signal;
a polarization phase-shift branch transmitting the second signal, the polarization phase-shift branch comprising:

an optical element to shift the phase angle by approximately 45°;
another optical element to rotate the polarization angle by approximately 45°;
a second PBC to separate the second signal into two other orthogonally polarized signals; and
other two detectors to detect the RF tone modulating the two other separated orthogonally polarized signals from the second signal.

12. The system of claim 8, wherein the feedback calculation sub-module comprises:
a differential detector to measure a quantity A representing the difference between the two separated orthogonally polarized signals from the first signal;
another differential detector to measure a quantity B representing the difference between the two other separated orthogonally polarized signals from the second signal; and
a summation module to calculate the sum of an absolute value of A and an absolute value of B or the sum of an square value of A and an square value of B.

13. A method for monitoring a polarization state of a polarization division multiplexed (PDM) signal received at a PDM receiver, the method comprising:
providing two orthogonally polarized signals;
providing an RF modulation for one of the two signals;
multiplexing the two orthogonally polarized signals into a PDM signal;
receiving the PDM signal after transmission through an optical line;
extracting a monitoring signal from the received PDM signal, wherein the extracting is performed prior to demultiplexing the PDM signal, wherein a polarization state of the monitoring signal is substantially the same as the polarization state of the received PDM signal;
measuring the polarization state of the monitoring signal; and
comparing the measured polarization state with a target polarization state determined during a previously performed calibration procedure.

14. The method as in claim 13, further comprising:
transmitting the PDM signal through a polarization controller placed at the input of the PDM receiver.

15. The method as in claim 14, further comprising:
adjusting the polarization controller to minimize a difference between the measured polarization state and the target polarization state.

16. The method as in claim 13, wherein the polarization state of the monitoring signal comprises a plurality of independent components of a Stokes vector.

17. The method as in claim 16, further comprising:
altering the polarization state of the monitoring signal to a first altered state;
detecting the first altered polarization state;
recording the first altered polarization state;
altering the polarization state of the monitoring signal to a second altered state;
detecting the second altered polarization state;
recording the second altered polarization state, thereby determining two independent coordinates of the polarization state.

18. The method as in claim 17, wherein the detecting further comprises:
for each of the respective altered states, measuring the RF modulation of the monitoring signal.

19. The method as in claim 17, further comprising:
repeating the sequence of altering, detecting, and recording steps more than two times, thereby over-determining the two independent coordinates of the polarization state; and
obtaining the estimation error.

20. The method as in claim 17, wherein the altering comprises rotating angular or phase components of the polarization state.

21. The method as in claim 13, wherein the calibration procedure to determine the target polarization state comprises:
providing a linearly polarized test signal;
transmitting the provided test signal through an optical transmission line;
receiving the transmitted test signal using at the PDM receiver, wherein the PDM receiver includes a polarization compensator and a polarization beam combiner (PBC) placed downstream from the polarization compensator;
splitting the test signal using the PBC;
detecting the split test signal at one receiver module of the PDM receiver;
rotating a polarization of the test signal, by adjusting the polarization compensator, to optimize a parameter of the detected test signal;
measuring, prior to the PBC, the rotated polarization of the test signal corresponding to the optimized detected signal; and
recording the measured polarization of the test signal as a target polarization state for the polarization state monitoring module of the PDM receiver.

* * * * *